Dec. 22, 1964    R. R. SCOBEE    3,162,013
IGNITER FOR ROCKET MOTOR
Filed Feb. 26, 1962
3 Sheets-Sheet 1
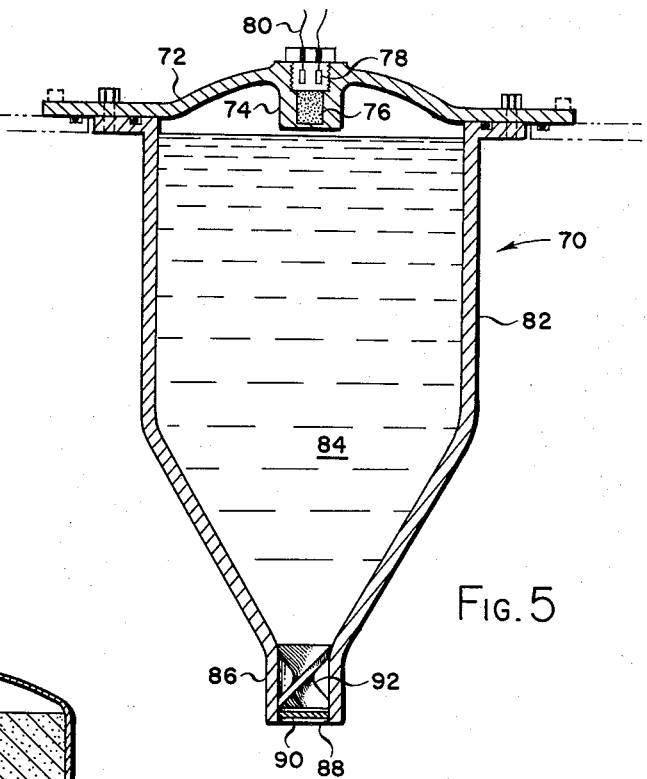
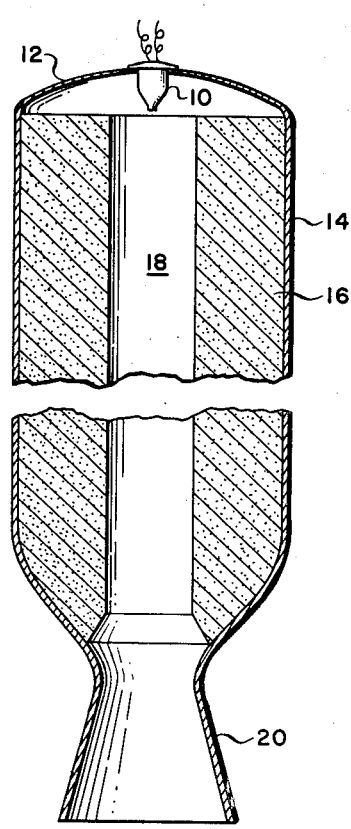
INVENTOR.
ROBERT R. SCOBEE
BY
George C. Sullivan
Agent Dec. 22, 1964 R. R. SCOBEE 3,162,013
IGNITER FOR ROCKET MOTOR
Filed Feb. 26, 1962 3 Sheets-Sheet 2

INVENTOR.
ROBERT R. SCOBEE
BY
*George Sullivan*
Agent

Dec. 22, 1964   R. R. SCOBEE   3,162,013
IGNITER FOR ROCKET MOTOR
Filed Feb. 26, 1962   3 Sheets-Sheet 3

INVENTOR.
ROBERT R. SCOBEE
BY
Agent

United States Patent Office 3,162,013
Patented Dec. 22, 1964

3,162,013
IGNITER FOR ROCKET MOTOR
Robert R. Scobee, Redlands, Calif., assignor, by mesne assignments, to Lockheed Aircraft Corporation, Burbank, Calif., a corporation of California
Filed Feb. 26, 1962, Ser. No. 175,556
10 Claims. (Cl. 60—39.82)

This invention relates to an igniter for a solid propellant rocket motor and more particularly to an igniter which contains a starting fluid which is hypergolic, or spontaneously ignitable, with the propellant in the motor.

The present igniter is particularly useful in large rockets used for space travel. To boost these rockets into space, a number of motors may be clustered together to provide increased thrust. These motors may be as long as 100 feet or longer and may have diameters of 10 feet or greater. Because of the large mass of propellant contained in these motors, it is necessary that the igniter contain relatively large quantities of starting fluid, say on the order of 60 to 70 pounds, which can be brought into contact with the propellant to start combustion. It is also necessary that some injection means be provided in the igniter which will force the starting fluid to come into contact with as much surface area of the propellant as possible. Also, where a cluster of motors is used, it is necessary that combustion in each of the motors be started simultaneously to provide balanced thrust.

Accordingly, it is an object of the present invention to provide a reliable igniter which is capable of quickly injecting a large volume of starting fluid onto the propellant surface.

It is another object of the present invention to provide an igniter which will disperse the starting fluid over a wide area of propellant grain so that maximum thrust will be obtained as soon as possible.

It is another object of the present invention to provide an igniter which does not carry a great deal of weight in the form of injection apparatus for the starting fluid. In accordance with the present invention, the starting fluid generates its own injection gases by reacting with a metallic fuel component in the igniter. In one form of the invention, an aluminum powder charge is brought into contact with the starting fluid to start a vigorous reaction in which injection gas is produced. In another form of the invention, the starting fluid is in contact with a passivated aluminum surface which is normally unreactive with the fluid but which can be broken down or penetrated to expose bare aluminum metal which will react vigorously with the fluid. The gases created by these reactions inject the starting fluid onto the propellant grain where it starts immediate combustion.

It is another object of the present invention to provide an igniter which can be used in a cluster arrangement of rocket motors wherein simultaneity of starting action is of high importance.

These objects and other features of the present invention will be better understood from the following detailed description of the accompanying drawings in which:

FIGURE 1 is a schematic illustration of the igniter of the present invention in relation to a rocket motor;

FIGURE 5 is a sectional view showing still another embodiment of the igniter of the present invention.

Figure 2:
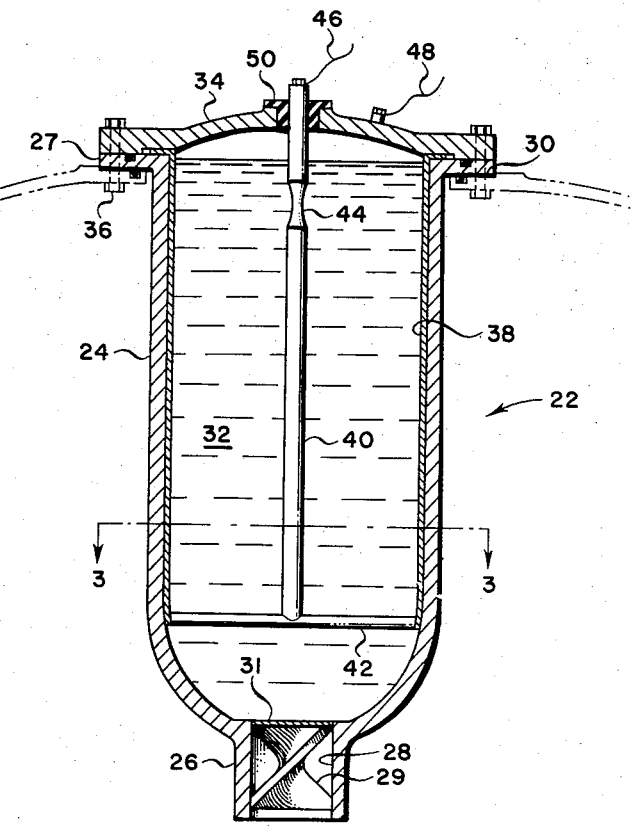
FIGURE 2 shows a sectional view of one embodiment of the igniter of the present invention.
Figure 3:
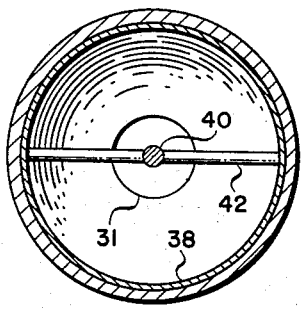
FIGURE 3 is a sectional view taken along the line 3—3 of FIGURE 2.

In FIGURE 1, the igniter of the present invention, represented generally as 10, is shown at the head end 12 of a motor 14. The motor may be the sole power package for a rocket or it may be clustered together with other similar motors, as previously explained. Motor 14 carries a solid propellant grain 16 which may consist of any of the conventional solid propellants such as a double base propellant or a rubber base propellant. Grain 16 has a central port 18 where combustion of the grain takes place. A suitable nozzle 20 is provided to produce thrust in known manner. Igniter 10 is positioned centrally with respect to the grain 16 so that the starting fluid can be injected into the port 18.

In the embodiment shown in FIGURE 2, the igniter 22 of the present invention has a bottle-shaped metallic body or case 24 and a protruding neck or boss 26. Boss 26 has a discharge opening 28 into which is placed a swirl vane 29 which provides for a conical spraying of the fluid as it is injected into port 18. A pressure burst diaphragm 31, which is adapted to rupture at a predetermined pressure, is used to close opening 28. The igniter is attached to the motor 14 by means of an annular flange 27 on the body which rests in a central recess 30 in the motor case. After the starting fluid 32 has been added to the igniter, the igniter is capped or closed with a disc or cover 34 which is secured to the motor by mounting bolts 36 through flange 27.

Starting fluid 32 in the igniter may consist of such highly reactive fluids as chlorine trifluoride, bromine pentafluoride, and bromine trifluoride. Of these, chlorine trifluoride is the preferred fluid.

Case 24 and cover 34 are preferably made of an alloy such as Monel metal which is fairly resistant to the above reactive fluids. In order to increase the resistance, the interior surfaces which may come into contact with the fluid are passivated by exposure to chlorine trifluoride vapor or fluorine gas. As long as the passivated surfaces are unbroken, there is no reaction with the starting fluid.

The reactive fuel component for the fluid is provided by an aluminum lining or shell 38 in the igniter, by aluminum rod 40 centrally placed in the igniter and extending from the cover 34 to a point near the neck 26, and another aluminum rod 42 connecting rod 40 and shell 38. These aluminum components are also passivated with chlorine trifluoride vapor or fluorine gas so that normally there is no reaction with the starting fluid. Reaction is started by breaking down the passivated surface at a narrowed or necked-down portion 44 in rod 40 by means of a high electrical current sent through leads 46 and 48 connected respectively to rod 40 and to cover 34. Rod 40 is electrically insulated from the cover 34 by a suitable insulator 50.

The fuel component for the fluid may be aluminum, as illustrated, or it may be magnesium, copper, or other metal which can be initially passivated with the fluoride vapor or fluorine gas. The term "light metal" as used hereinafter includes aluminum and magnesium, severally.

In operation, igniter 22 is fired by closing the low voltage, high current electrical circuit. The high current melts necked-down portion 44, thereby exposing bare aluminum to the starting fluid. Once the passivated surface is broken, the starting fluid reacts immediately with the bare aluminum. The reaction may also be started by sufficient local heating of the necked-down portion 44 without actual fusion of the portion. Once the reaction starts, rod 40 is progressively attacked and consumed by the fluid. The reaction continues with rod 42 and then shell 38 as the passivated surfaces are penetrated by the fluid. The highly exothermic reaction generates gaseous products which burst diaphragm 31 at a predetermined pressure and inject the remainder of the starting fluid into port 18 and onto the grain surface. Swirl vane 29 causes the ensuing fluid to be dispersed into a conical spray and thus provides intimate contact of the fluid with the propellant grain. Although a swirl vane has been shown for illustrative purposes, other means for dispersing the fluid may be used such as convergent-divergent opening or an internal pintle. The pressure generated in the igniter is sufficient to inject the fluid a considerable distance into the propellant port. When the aluminum components are consumed, the fluid will also attack the case in a continuing reaction, although at a somewhat diminished rate. It will be apparent that by varying the thickness of rods 40, 42 and shell 38 the speed and duration of the reaction can be controlled for any given application of the igniter.

Figure 4:
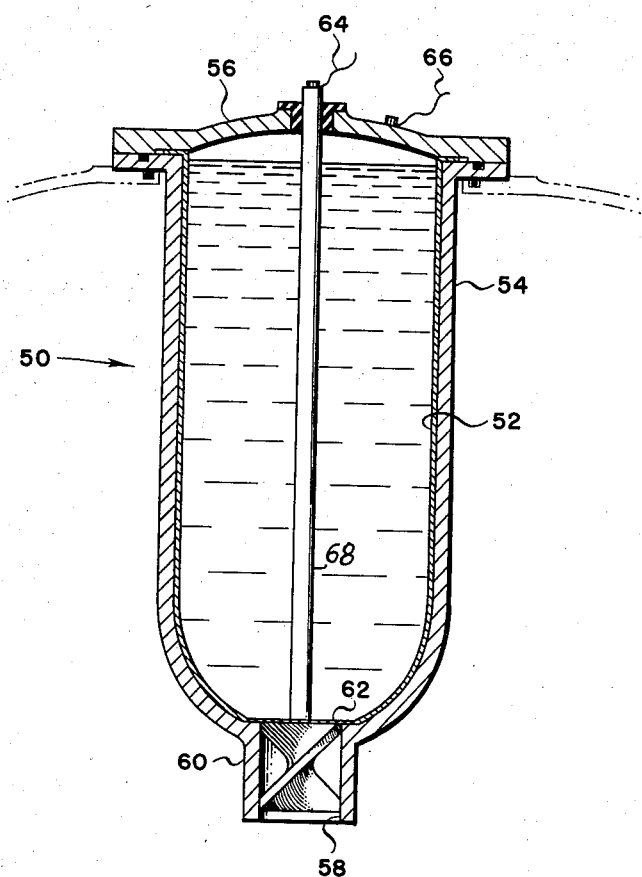
FIGURE 4 is a sectional view of another embodiment of the igniter of the present invention.

In the embodiment shown in FIGURE 4, igniter 50 of the present invention is substantially identical with igniter 22 except for the following details. The aluminum shell lining 52 covers the entire interior of the case 54 excluding cover 56 and a small area adjacent the discharge opening 58 in boss 60. The area is covered with a thin aluminum disc 62. When the electrical circuit is closed through leads 64, 66, disc 62 is immediately melted and reaction starts with the exposed portions of shell 52 and central aluminum rod 68, which extends to disc 62 from cover 56. With this embodiment, flow of the starting fluid into the propellant surfaces is immediate. Where clusters of motors are used, this assures simultaneous starting of the motors.

FIGURE 5 shows another igniter 70 which is similar to the two previous igniters. Cover 72 carries a receptacle or cartridge 74 which contains an aluminum powder charge 76 and squibs 78 which can be fired by actuating electrical leads 80. The interior surfaces of the case 82 and cover 72 are also passivated with chlorine trifluoride vapor or fluorine gas to prevent reaction with the starting fluid 84. Case 82 also has a neck 86 with a discharge opening 88 which is closed off with a pressure burst diaphragm 90 adapted to rupture at a predetermined pressure. Swirl vane 92 in opening 88 provides for conical spraying of the fluid as it is ejected out of the igniter.

In operation, firing of the squibs 78 will cause the aluminum powder charge to come into contact with fluid 84, immediately starting a vigorous reaction. At the predetermined pressure buildup in the igniter, diaphragm 88 will burst, discharging the fluid onto the propellant grain in a conical spray. Here again the pressure buildup in the igniter is rapid, and a relatively large volume of fluid will be ejected in a short period of time.

In a broad aspect, the present invention also comprises a method of generating high energy gases by placing a metallic fuel component in contact with a highly reactive liquid fluoride such as chlorine trifluoride, bromine pentafluoride, and bromine trifluoride. The fuel component would be comprised of light metals such as aluminum or magnesium, of copper, or of other metal which can be initially passivated with the fluoride vapor or fluorine gas to prevent reaction with the liquid fluoride. Upon disturbing the passivation by localized electrical heating, the fuel component and the fluid would react immediately to produce gases. The igniters previously described are examples of how this method of generating gases may be utilized in a practical application.

Although certain specific details of construction and operating conditions have been given for illustrative purposes, it is to be understood that the scope of the present invention is to be limited only by the appended claims.

I claim:

1. An igniter for solid propellant rocket motor comprising: a casing having a discharge opening; liquid chlorine trifluoride contained in said casing; an aluminum fuel component contained in said casing for reacting with the chlorine trifluoride, said fuel component comprising a central rod with a necked-down portion, a shell lining for the casing, and a second rod connecting the central rod with the shell lining; said fuel component and casing interior having passivated protective surfaces which are unreactive with the fluid; a low voltage, high electrical current source for fusing the necked-down portion of the central rod and exposing the base material whereupon reaction takes place between the chlorine trifluoride and the fuel component to produce high pressure discharge gases; a passivated pressure burst diaphragm for the discharge opening, said diaphragm adapted to rupture at a predetermined gas pressure; and a swirl vane in the discharge opening for producing a conical spray of the chlorine trifluoride as it is ejected from the casing by the reaction gases.

2. An igniter for a solid propellant rocket motor comprising: a casing having a discharge opening; liquid chlorine trifluoride contained in said casing; an aluminum fuel component contained in said casing for reacting with the chlorine trifluoride; said fuel component comprising a central rod, a shell lining for the casing, and a thin disc covering the discharge opening; said fuel component and casing interior having passivated protective surfaces which are unreactive with the fluid; a low voltage, high electrical current source for fusing the disc and exposing bare aluminum whereupon reaction takes place between the chlorine trifluoride and the aluminum to produce high pressure discharge gases; and a swirl vane in the discharge opening for producing a conical spray of the chlorine trifluoride as it is ejected from the casing by the reaction gases.

3. An igniter for a solid propellant motor comprising: a casing adapted for mounting at the head end of the motor; a cover for said casing exterior of the motor; a highly reactive fluid contained in said casing, said fluid being hypergolic with the propellant; a cartridge in said cover, said cartridge containing an aluminum powder charge and electrical squibs for firing the charge into the fluid to start reaction therewith and produce gases; and discharge means for the fluid, said means including a pressure burst diaphragm adapted to rupture at a predetermined pressure and a swirl vane for producing a conical spray of the fluid as it is ejected from the igniter by the gases.

4. An igniter for a solid propellant rocket motor comprising: a casing having a discharge opening; a highly reactive fluid contained in said casing, said fluid being hypergolic with the propellant; cartridges containing an aluminum powder charge for reacting with the fluid; electrical means for firing the cartridges to bring the powder into reactive contact with the fluid whereupon high pressure discharge gases are generated; and discharge means for the fluid, said means including a swirl vane in the discharge opening to produce a conical spray of the fluid upon ejection from the igniter.

5. An igniter for a solid propellant rocket motor comprising: a casing having a discharge opening; a highly reactive fluid contained in said casing, said fluid being hypergolic with the propellant; an aluminum fuel component contained in said casing for reacting with the fluid; said fuel component and casing interior having a passivated protective surface which is unreactive with the fluid; electrical means for breaking down the passivated surfaces and exposing bare aluminum whereupon reaction takes place between the fluid and the fuel component to produce high pressure discharge gases; and discharge means for the fluid, said means comprising a pressure burst diaphragm for the discharge opening, said diaphragm being adapted to burst at a predetermined gas pressure, and a swirl vane adapted to produce a conical spray of the fluid upon ejection from the igniter.

6. An igniter for a solid propellant rocket motor comprising: a casing having a discharge opening; a highly reactive fluid contained in said casing, said fluid being hypergolic with the propellant; an aluminum fuel component contained in said casing for reacting with the fluid; said fuel component and casing interior having a passivated protective surface which is unreactive with the fluid; electrical means for breaking down the passivated surfaces and exposing bare aluminum whereupon reaction takes place between the fluid and the aluminum to produce high pressure discharge gases; and discharge means for the fluid, said means including a swirl vane in the discharge opening to produce a conical spray of the fluid upon ejection from the igniter.

7. An igniter for a solid propellant rocket motor comprising: a casing having a discharge opening; a highly reactive fluid contained in said casing, said fluid being hypergolic with the propellant; a light metal fuel component for reacting with the fluid to generate high pressure discharge gases, said fuel component being initially passivated to prevent reaction with the fluid; electrical means for disturbing the passivated condition of the fuel component to initiate reaction between the fuel component and the fluid; and discharge means in the opening for dispersing the fluid as it is ejected from the casing by the discharge gases.

8. An igniter for a solid propellant rocket motor comprising: a casing; a highly reactive fluid contained in said casing, said fluid being hypergolic with the propellant; a fuel component for the fluid; and electrical firing means for initiating reaction between the fuel component and the fluid to generate high pressure gases which discharge the fluid onto the propellant.

9. A method of generating high energy gases comprising: placing a metallic fuel component having passivated external surfaces in contact with a highly reactive liquid fluoride; and then locally heating the passivated surfaces to initiate reaction between the fuel component and the fluoride.

10. A method of generating high energy gases comprising: placing a light metal fuel component having passivated external surfaces in contact with chlorine trifluoride, and then disrupting the passivated surfaces by electrical means to initiate reaction between the fuel component and the chlorine trifluoride.

References Cited by the Examiner
UNITED STATES PATENTS

| | | | |
|---|---|---|---|
| 2,526,220 | 10/50 | Goddard | 229—121 |
| 2,741,182 | 4/56 | Faust et al. | 102—82 |
| 2,958,193 | 11/60 | Prince | 60—39.48 X |
| 2,974,484 | 3/61 | Cooley | 60—35.6 X |

CARLTON R. CROYLE, *Primary Examiner.*

SAMUEL FEINBERG, SAMUEL LEVINE, *Examiners.*